United States Patent

Davis, II

[15] 3,702,007

[45] Oct. 31, 1972

[54] TABLE DRIVEN PROGRAM

[72] Inventor: Roderic A. Davis, II, Pleasant Valley, N.Y.

[73] Assignee: International Business Machines Corporation, Armonk, N.Y.

[22] Filed: Dec. 7, 1970

[21] Appl. No.: 95,747

[52] U.S. Cl. ....................................................444/1

[51] Int. Cl. .............................G06f 9/12, G06f 7/22

[58] Field of Search .........................340/172.5; 444/1

[56] References Cited

UNITED STATES PATENTS

| | | | |
|---|---|---|---|
| 3,246,304 | 4/1966 | Brown et al. | 340/172.5 |
| 3,348,214 | 10/1967 | Barbetta | 340/172.5 |
| 3,353,157 | 11/1967 | Chesarek et al. | 340/172.5 |
| 3,371,320 | 2/1968 | Lachenmeyer | 340/172.5 |
| 3,400,379 | 9/1968 | Harman | 340/172.5 |
| 3,582,896 | 6/1971 | Silber | 340/172.5 |

OTHER PUBLICATIONS

" Decision Tables and Their Application", Paul Dixon, Computers and Automation, April, 1964, pp. 14–19.
" Tabular Form in Decision Logic" , Burton Grad, Datamation, July, 1961 pp. 22- 26.
" Programming Decision Tables in Fortran, Cobol, or Algol" , C. Veinott, Comm. of the ACM. Vol. 9, No. 1, January, 1966, pp. 31–35.
"Use of Decision Tables in Computer Programming" , H. Kirk, Comm. of the ACOM, Vol. 8, No. 1, January 1965, pp. 41– 43.
"Logic Structure Tables" , H. Contrell, J. King, and F. King, Comm. of the ACM, Vol. 4, June 1961, pp. 272- 275.
" A Procedure for Converting , Table Conditions into an Efficient Sequence of Test Instruction" , J. Egler, Comm. of the ACM, Sept. 1963, pp. 510— 514.
" Conversion of Limited- Entry Decision Tables to Computer Programs" , S. Pollock, Comm. of the ACM, Vol. 8, No. 11, Nov. 1965, pp. 677- 682.
" Conversion of Decision Tables to Programs" , L.I. Press, Comm. of the ACM, Vol. 8, No. 6, June 1965, pp. 385- 390.

*Primary Examiner*—Paul J. Henon
*Assistant Examiner*—Jan E. Rhoads
*Attorney*—Hanifin & Jancin and William S. Robertson

[57] ABSTRACT

A new decision table and method of using the decision table with data processing apparatus are disclosed. A general purpose driver is provided for executing various decision tables. When a problem program reaches the point where a decision table is to be executed, the problem program calls the driver and identifies the selected decision table. The condition stub of the decision table includes a series of instructions from which the driver forms a condition mask. The driver selects the appropriate action according to the condition mask and a set of rules and an action stub in the decision table. The action may comprise a single instruction or series of related instructions or several independent instruction or groups of instructions.

6 Claims, 4 Drawing Figures

INVENTOR
RODERIC A. DAVIS II

BY W. J. Robertson
ATTORNEY

TABLE DRIVEN PROGRAM

Although decision tables are well-known, it will be helpful to review the features and the terminology that particularly apply to this invention. A decision table is a tabular arrangement of various possible combinations of input variables and the action that is to be taken in response to each of the combinations of input variables. In an example to which this invention particularly applies, the inputs are various status words that are available in a data processing system when a magnetic tape unit has failed. Bits of these words tell what the unit was doing at the time of the failure and they tell something about the cause of the failure. A person who knew the various actions that could be taken after failure might look over the status words and select the appropriate action. In the known prior art, the table has been made up of a condition stub, a set of rules, and an action stub. The condition stub defines the various possible states of inputs to the table. Each rule shows a particular group of input variables for which a particular action is appropriate. Thus, in the execution of a decision table the condition stub is executed to establish which variables apply to the problem and the variables are compared with the rules to find a match. The action stub tells the appropriate action to be taken. The term "action" will be used to mean executing a single instruction, a group of related instructions or several independent instructions or group of instructions. Thus, the output of the decision table is a set of operations to carry out the appropriate action. The publication "Decision Tables - A Systems Analysis and Documentation Technique," Form No. GF20—8102—0, has several simple examples of decision tables, and the paper "Use of Decision Tables in Computer Programming" by H. W. Kirk at page 41 — 43 of the January, 1965, Vol. 8, No. 1, "Communications of The ACM" has examples of logical operations on decision tables.

THE INVENTION

This invention includes a routine called a driver that executes the decision table. The driver is independent of the decision table and can be used with various different tables. When the problem program reaches the point where a decision table is to be executed, the problem program calls the driver. In the calling sequence, the problem program identifies the selected decision table. The decision table has been previously established in a suitable format by the problem programmer. The condition stub of the table includes a series of instructions for logical operations on the inputs to form a condition mask. Thus, in the example already introduced, the instructions in the condition stub identify and test the components of the tape unit status words that are relevant to the action stub of the table. The driver executes each instruction of the condition stub and forms a condition mask by appending a right 1 or 0, depending on the hardware condition code set by that instruction, to the previous condition mask. A wide variety of instructions are useful in the condition stub.

THE DRAWINGS

THE EMBODIMENT OF THE DRAWINGS

Introduction

The preferred embodiment of the invention will be described as it is adapted for the instruction set described in the publication *IBM System/360 Principles of Operation*, Form A22—6821—6. Specific instructions that are used for illustration will be written in upper case, for example, TEST UNDER MASK. The example of handling a tape unit failure will be used where an example may be helpful. The method can be used with various instruction sets and is useful with various problem programs.

Figure 1:
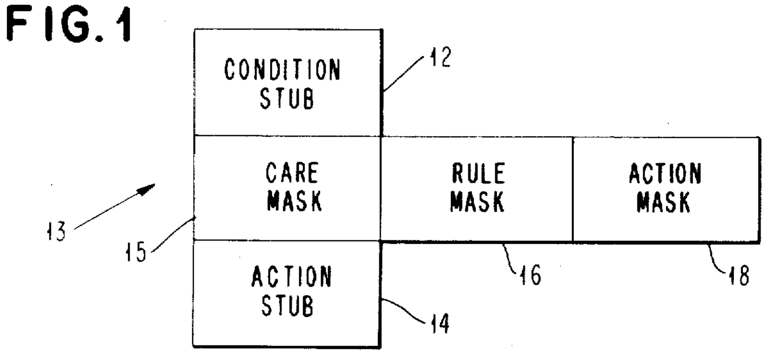
FIG. 1 is a schematic representation of the decision table of the invention.

The Decision Table of FIG. 1

The decision table includes a condition stub 12, a set of rules 13, and a action stub 14. The rules include a care mask 15, a rule mask 16, and an action mask 18. Each of the five blocks in FIG. 1 represents a series of addressable entries. The entries in the condition stub and the action stub are, for the most part, instructions. The three blocks of the rules 13 are aligned horizontally in the drawing to show that a rule is made up of a care mask, a rule mask, and an action mask and that the three entries that make up a rule are at consecutively addressable locations. The condition stub 12 comprises a series of instructions for logical operations on the inputs to the table to form the condition mask. The inputs to the table are in any available form and are identified in the instructions in the condition stub. Generally, the inputs will contain bits that are directly usable in the condition mask, bits that can be operated on by the instructions of the condition stub to form bits of the condition mask, and bits that are extraneous to the decision table. The condition stub is organized to form each bit of the condition mask by operations on the inputs. The starting address of the condition stub is passed to the driver as a parameter. Because the driver moves the instructions of the condition stub to execute the instructions, the instructions are located at fixed addressing increments in the condition stub. Because the driver operated on each entry in the condition stub, the last entry in the stub has a bit pattern that signifies the end of the stub.

The condition stub is arranged in the format already described with instructions that are appropriate to form a suitable condition mask from the available inputs. In the example of controlling a tape unit, one of the inputs is a status word that identifies the condition of the tape unit at the time of failure. A TEST UNDER MASK instruction in the condition stub tests a selected bit or group of bits in the status word. The channel status word and the channel command word are used as inputs also, and the COMPARE LOGICAL IMMEDIATE instruction is useful for testing bits of these words. Branches from the table to other routines or to other decision tables for forming bits of the condition mask are also useful.

The condition mask matches one (and only one) of the rules and in the operation of the driver that will be described later, the rules are searched to find the match. As is conventional, the combination of a care mask and a rule mask permits setting out all possible combinations of condition mask variables in a relatively small number of rules. The rule mask and the care mask have 0's in bit positions for the don't care condition. The rule mask has 1's and 0's as appropriate in the other bit positions, and the care mask has 1's in these other positions. As is conventional, the AND function of the care mask and the rule mask produces 0's in the don't care positions and preserves the bits of the rule mask in the care positions. A comparison of the result of the AND operation and the rule mask indicates a match or a mismatch between the condition mask and the rule being tested. Since this search operation produces only one significant match, the match signifies that the operation on the rules has been completed. The action mask of the matching rule is used to find the appropriate action in the action stub. The instructions of the action stub may lead to executing other decision tables, to executing the same decision table with different inputs, or to some other action such as controlling a tape drive for a selected operation.

The Driver-Introduction

Figure 2:
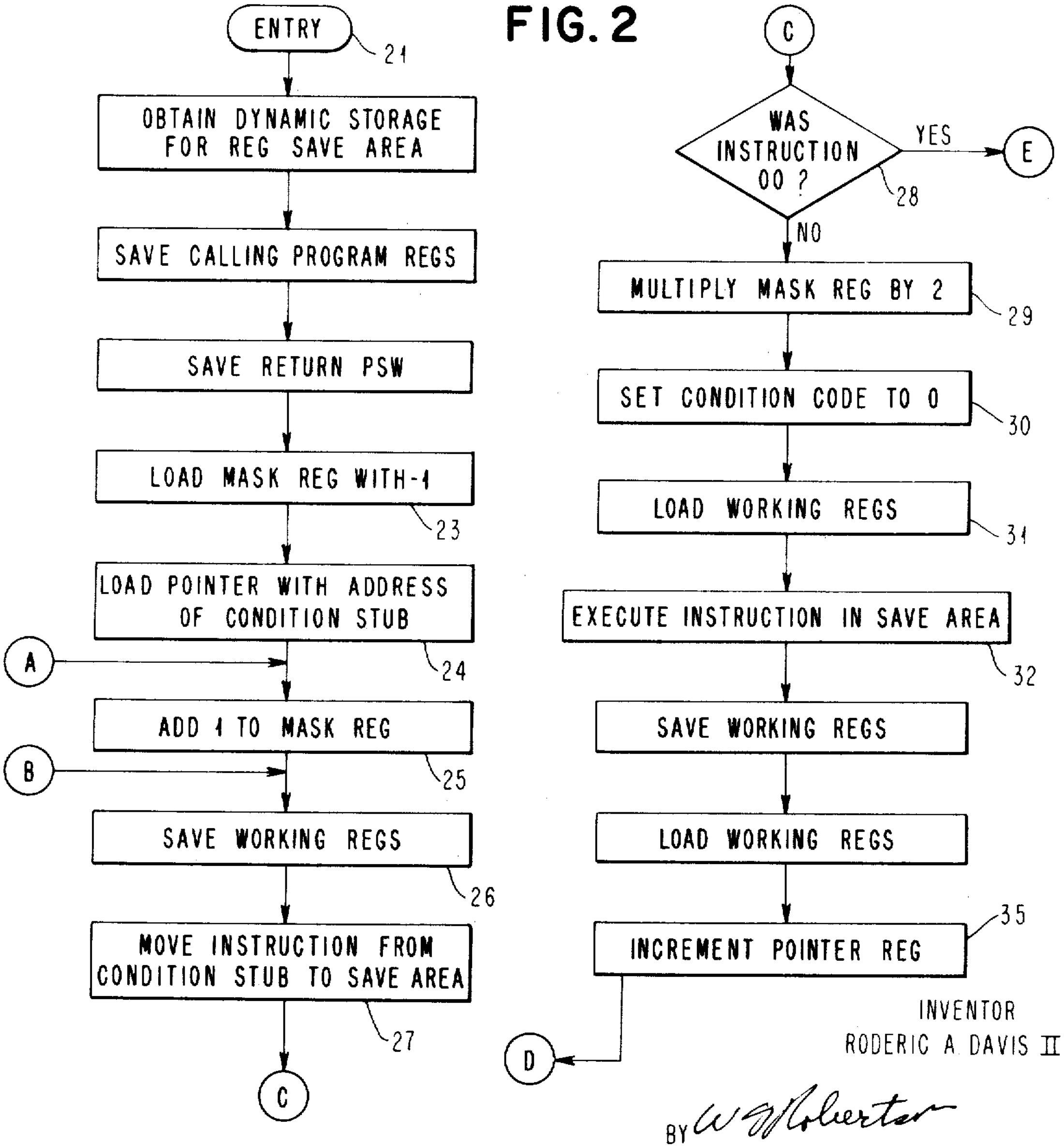
FIGS. 2 through 4 are a flow diagram showing the execution of the decision table by the driver of this invention.

In FIG. 2, the entry 21 of the driver is provided by a calling routine of a problem program that includes the decision table of FIG. 1. The next three operations conventionally isolate the driver from the problem program. Operation 23 loads a register with −1. This register will be used in this part of the driver routine to hold the condition mask and it will be called the mask register. (The significance of operation 23 will be explained later). In operation 24, the driver loads a pointer register with the address of the condition stub which is provided by the problem program in the entry routine. The driver is now ready to operate on each entry of the condition stub in sequence to form the condition mask.

Forming the Condition Mask

Figure 3:
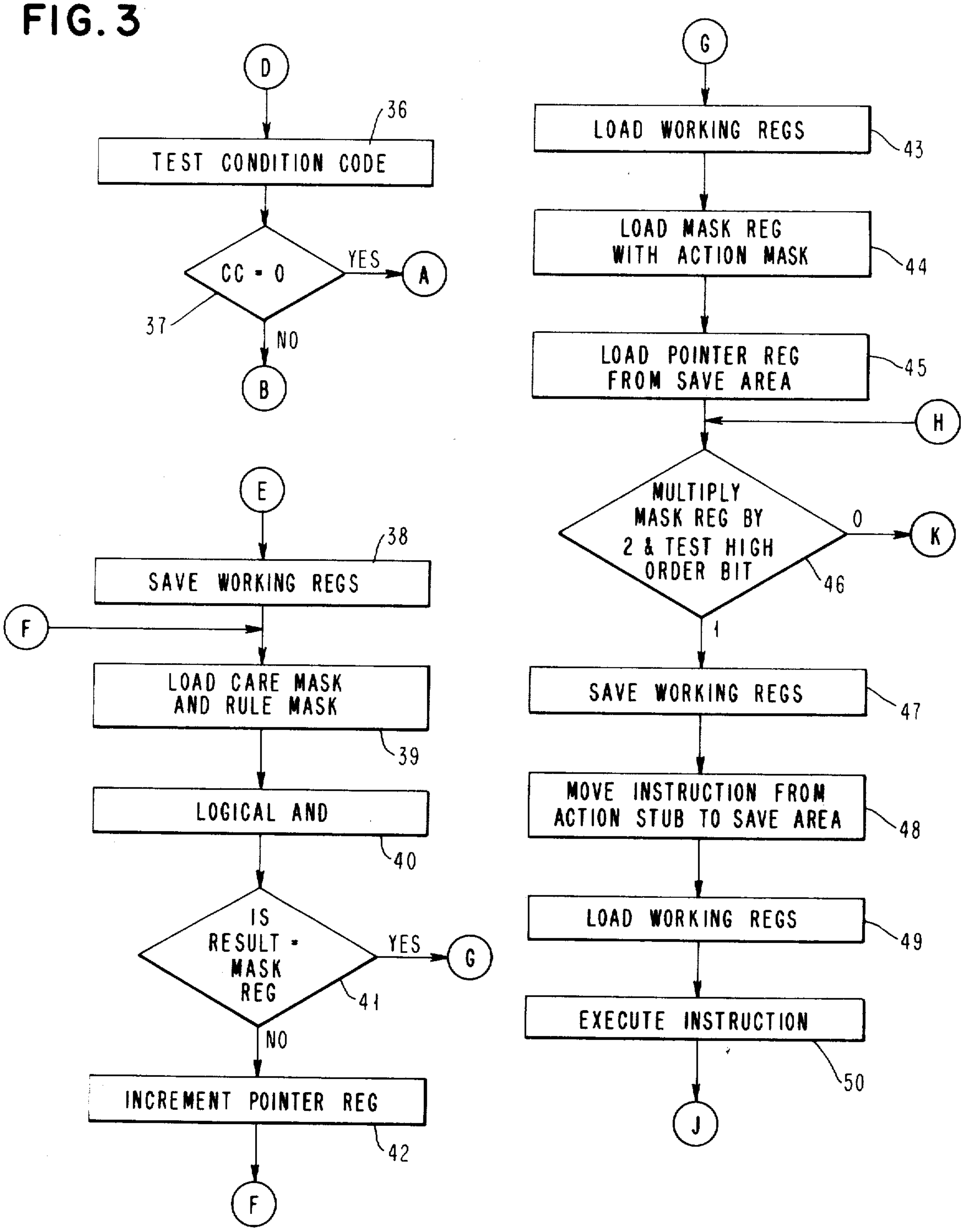

Operations 25, 27, 32, and 29 in FIG. 2 and operation 36 in FIG. 3 show the basic operation of forming a bit of the condition mask from an entry in the condition stub. In operation 27, the driver moves the instruction from the condition stub into the save area. Note that the pointer register which was initialized in operation 24 points to the instruction that is to be operated on and that the save area was established in the initial instructions. The operation of transferring the instruction to the save area helps to isolate the driver from the problem program and is an important feature of the invention. Operation 26, which stores the registers used by the driver in the save area of the storage, and operation 31 which loads the registers from the save area are standard routines for such operations.

When the instruction has been moved from the entry in the condition stub to the save area, the driver executes the entry with the EXECUTE instruction. This instruction produces a branch to the location of the save area and a return to the next instruction in the driver sequence. The instructions in the condition stub produce a test on an input to the decision table and produce a change in the condition code of the program status word (with exceptions that will be described later). Operations 36 and 37 (FIG. 3) test the condition code and produce a branch to point A (FIG. 2) if the condition code is 0 and to point B if the condition code is not 0. Thus, the operation proceeds from points A or B to the branch at operation 37 until all of the entries in the condition stub have been executed.

Operations 25 and 29 construct the condition mask in response to the branch at operation 37, which has just been described. Operation 29 shifts the condition mask one bit to the left and enters a 0 in the right most bit position (i.e. the condition mask is multiplied by 2). If branch A is later taken as a result of the next operation on an instruction in the condition mask, operation 25 puts a 1 in the right most bit position of the mask register. If branch B is taken, operation 25 is skipped and the 0 entered in the right most bit position of the mask register by the preceeding operation 29 is preserved. With the first execution of operation 25, the mask register is advanced to 0 from its setting of −1 in operation 23.

The other operations on the condition stub can now be understood easily. As FIG. 2 shows, operation 35 increments the pointer register. Operation 30 sets the condition code to 0 to produce a branch to point B for any instruction in the condition stub that does not change the condition code. For such an operation, it is desirable to maintain the corresponding bit in the condition mask at a fixed value that is independent of the previous operation 28. When the operation of forming the condition mask from the condition stub is completed, a branch is taken to point E in the flow chart to begin the operation of finding the matching rule in part 13 of the decision table.

Finding the Matching Rule

Operation 38 saves the registers of the problem program. The loop of operations 39 – 42 searches through the rules to find the first rule that matches the condition mask. Operation 39 loads the care mask and the rule mask of the next rule into separate registers. In operation 40, the AND function of these two registers is performed. In this function, 0's exist in coincidence with 0's in the care mask; 1's and 0's exist in the other positions and they may or may not match the corresponding positions of the condition mask. In operation 41, the logical AND function formed in operation 40 is compared with the condition mask. If the result is not equal to the condition mask, the pointer is incremented and the operation begins on the next entry in the rules. When a match is found, the operation continues at point G in FIG. 3.

The Operation on the Action Stub

The next operations select entries in the action stub according to the action mask. In operation 44, the mask register is loaded with the action mask. (The action mask is addressable from the pointer register.) In operation 45, the pointer register is loaded from the save area to hold the address of the action stub included in the last entry of the condition stub and stored in the save area (operation 27).

The general operation of finding the appropriate rules is to shift the mask register one bit position to the left and test whether the left most bit is a 1 or a 0 . The instruction BRANCH ON INDEX LOW performs this test, as operation 46 schematically shows, by shifting the mask register one bit position to the left (multiplying the contents of the mask register by 2) and comparing the shifted number with the original number; the shifted number will be high except when a 1 is shifted into the left most bit position and is interpreted as a negative sign bit.

Figure 4:
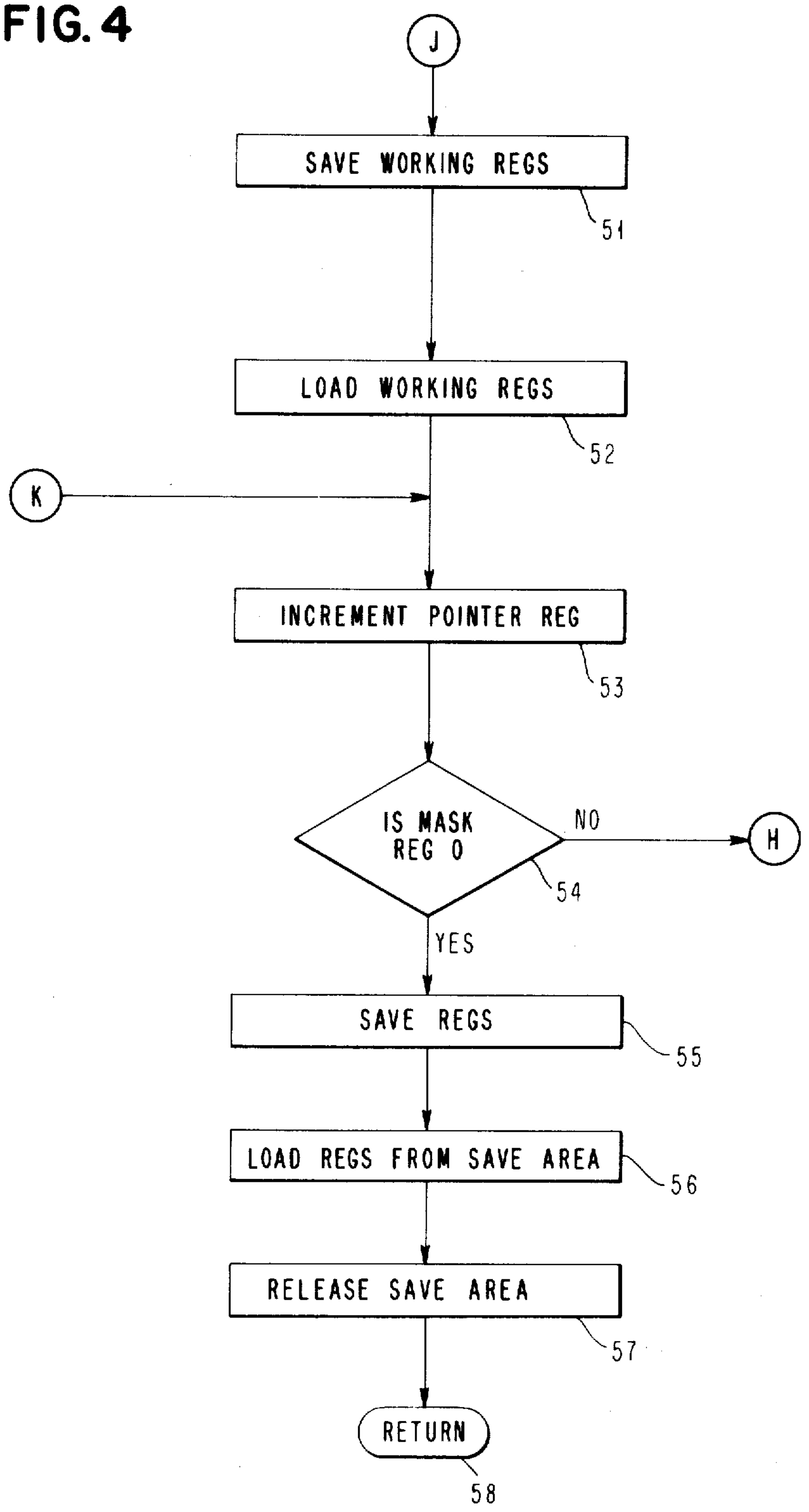

Until a 1 is found in the left most position, the operation continues through branch K in FIG. 4 to increment the pointer register which identifies the corresponding entry in the action stub and to return to operation 46 to test the next bit of the action mask. When a 1 is found in the high order bit position of the mask register, the program continues through operations 47 — 52 to execute the instruction in the action stub. Operation 48 moves the instruction to the save area and operation 50 executes the instruction. Operations 47, 48, 51 and 52 save and load the registers in the way that has been explained. The pointer is incremented in operation 53, as already described. Operation 54 tests the action mask for the presence of all 0's, which signifies that all actions have been taken. When the actions have been completed, operations 55 — 58 are performed, as is conventional, for returning to the problem program.

From this description of the preferred embodiment of the invention, those skilled in the art will recognize a wide variety of applications for the method and variations appropriate to particular applications and to the operation in data processing systems of various designs.

What is claimed is:

1. A method of operating in a data processing system to select an action stub predetermined problem program instructions corresponding to the one of a set of predetermined problem program rules matching a set of input conditions expressed as multi-bit inputs and a condition stub having a set of problem program instructions for organizing said inputs as a condition mask comparable in organization with said rules, comprising, first, isolating said problem program to prevent modification, executing the instructions of said condition stub to form a condition mask, comparing said condition mask and said rules to identify the matching rule, executing said corresponding actions, and returning to said problem program.

2. The method defined in claim 1 wherein said method is initiated by the step in said problem program of calling a program operating according to said method, and identifying said decision table.

3. The method defined in claim 2 wherein said step of executing said instructions of said condition stub to form a condition mask comprises isolating a next instruction of said condition stub, executing said instruction to test the corresponding portion of said input, and forming a next bit of said condition mask in response to the results of said testing step.

4. The method defined in claim 3 wherein said step of executing said instruction to test a portion of said input comprises a part of said program, moving a next instruction from said condition stub to a save area, and executing said saved instruction.

5. The method of claim 4 wherein said rules comprise a care mask, a rule mask, and an action mask, and said step of comparing said condition mask and said rules includes combining a next entry of said care mask and said rule mask to form a logical AND function and comparing said AND function and said condition mask to detect a match.

6. The method of claim 5 wherein said condition stub contains a distinct last instruction and said step of executing said instructions of said condition stub to form a condition mask includes, shifting a register one bit position to the left and entering a right most binary 0, transferring the next instruction of the condition stub to a save area, testing the instruction for said distinct instruction, executing the instruction if it is not said distinct instruction, testing the results of the execution of the instruction, adding a binary 1 to said register in response to a predetermined result of said test and not adding a binary 1 to said register in the absence of said predetermined result, transferring the next instruction to said save area for a next instruction, and beginning said step of comparing said condition mask and said rules when said distinct instruction is found.

* * * * *